United States Patent

Bejot et al.

[11] Patent Number: 5,664,646
[45] Date of Patent: Sep. 9, 1997

[54] DISC BRAKE, ESPECIALLY FOR VEHICLES

[76] Inventors: Philippe Bejot, 74, Rue de Miromesnil, F-75008 Paris; Jean Claude Monteillet, 12, Rue Adolphe-Avron, F-93700 Drancy, both of France; Jose Manuel Vila Boluda, Avd. Lleron No. 14, Les Franqueses, Del Valles, E-08520 Barcelone; J. Ruiz Busquets, Avd. Verge de Montserrat 114, 6°, 1, E-08820 El Prat de Llobregat, both of Spain

[21] Appl. No.: 553,641

[22] PCT Filed: Jun. 2, 1993

[86] PCT No.: PCT/DE94/00602

§ 371 Date: Feb. 29, 1996

§ 102(e) Date: Feb. 29, 1996

[87] PCT Pub. No.: WO94/28331

PCT Pub. Date: Dec. 8, 1994

[30] Foreign Application Priority Data

Jun. 2, 1993 [FR] France ................. 93/06553

[51] Int. Cl.⁶ ................. F16D 65/16; F16D 65/56
[52] U.S. Cl. ................. 188/71.9; 192/111 A; 74/12; 188/72.9
[58] Field of Search ................. 188/71.7–71.9, 188/72.7–72.9, 79.51, 79.55, 79.56, 79.58, 196 BA, 196 D; 192/76.23–70.26, 111 A, 111 B, 111 T; 74/102

[56] References Cited

U.S. PATENT DOCUMENTS

| | | |
|---|---|---|
| 3,346,080 | 10/1967 | Polanin . |
| 3,498,423 | 3/1970 | Belart . |
| 3,999,638 | 12/1976 | Margetts . |
| 4,567,966 | 2/1986 | Bayliss .................. 188/71.9 |
| 4,598,801 | 7/1986 | Villata . |
| 4,620,618 | 11/1986 | Monick .................. 188/196 BA |
| 4,705,147 | 11/1987 | Pressaco et al. .................. 188/79.56 |
| 4,819,768 | 4/1989 | Czich et al. .................. 188/196 D |
| 5,060,765 | 10/1991 | Meyer .................. 188/71.9 |
| 5,379,867 | 1/1995 | Macke et al. .................. 188/72.9 |
| 5,433,298 | 7/1995 | Antony et al. .................. 188/71.9 |
| 5,520,267 | 5/1996 | Gieving et al. .................. 188/72.9 |
| 5,582,273 | 12/1996 | Baumgartner et al. .................. 188/71.8 |

FOREIGN PATENT DOCUMENTS

| | | |
|---|---|---|
| 0186535 | 7/1986 | European Pat. Off. . |
| 9207202 | 4/1992 | European Pat. Off. . |
| 0499970 | 8/1992 | European Pat. Off. . |
| 2548310 | 4/1985 | France . |
| 2548309 | 4/1985 | France . |
| 1258209 | 1/1968 | Germany . |
| 2114692 | 8/1983 | United Kingdom . |

*Primary Examiner*—Robert J. Oberleitner
*Assistant Examiner*—Chris Schwartz
*Attorney, Agent, or Firm*—Barnes & Thornburg

[57] ABSTRACT

The invention relates to a disc brake with a housing, at least one brake pad, a lever device with an eccentric consisting essentially of a shaft fitted with an actuating or rotating lever, and with a pressure member or eccentric follower. The eccentric has two bearing sections on either side of the rotating lever; the eccentric follower has a bolt engaging in the central threaded hole of a nut. Two lateral bearings on the nut receive the bearing sections of the eccentric. There are mechanisms for taking up wear which extend the eccentric follower according to the wear of the brake pad by screwing the bolt out of the nut.

10 Claims, 9 Drawing Sheets

DISC BRAKE, ESPECIALLY FOR VEHICLES

BACKGROUND AND SUMMARY OF THE INVENTION

The invention relates to a disc brake, particularly for vehicles, having a stationary housing, at least one friction or brake lining which, when the brake is actuated, can be displaced with respect to the housing, a lever device with a shaft which can be rotated about a first axis fixed with respect to the housing, the shaft carrying an eccentric, and an actuating lever or rotating lever being fastened to the shaft in such a manner that it extends essentially perpendicularly to the first axis. As a result of the rotation of the shaft about the first axis, the brake can be actuated which is triggered by the pressure on the rotating lever, a pressure member or eccentric follower, which can be displaced within the housing along a second axis which extends essentially perpendicularly to the first axis. The follower rests with its first end on the eccentric and with its second end acting with respect to the brake lining: means are provided for adjusting and absorbing wear which increases the distance separating the first axis from the second end of the follower as a function of the wear of the brake lining.

A disc brake of this type is described, for example, in French Patent Document FR-A-2,548,309.

Disc brakes of this or a comparable type are known to a person skilled in the art; thus, with respect to the problem of providing a simple construction while the weight is low and the size is small.

With respect to all efforts of achieving these objects, the advantages of the simple construction and of the low weight or weight reduction, are countered by the requirements of a sturdy construction and a reliable operation.

Based on the above, it is an object of the present invention to provide a simple brake of the discussed type which has small dimensions and is nevertheless resistant in order to be suitable for being used in commercial vehicles.

For achieving this object, the brake according to the invention is distinguished by the following characteristics:

The eccentric has two bearing sections arranged on either side of the rotating lever;

on the one hand, the eccentric follower has, on the side of its first end, a nut with a central threaded bore as well as two essentially semicylindrical lateral bearing shells which are used for receiving the corresponding bearing sections of the eccentric;

on the other hand, the eccentric follower has a screw whose first end engages the nut, while a second end of the screw forms the second end of the eccentric follower or the pressure member; and the means for adjusting the wear generate a relative rotation of the screw and of the nut whereby the eccentric follower or pressure member can be extended.

According to a preferred embodiment of the invention which contributes to obtaining a brake of very small dimensions, the following characteristics are provided:

The rotatable lever arrangement with the eccentric is manufactured in one piece;

the screw extends by an amount which corresponds to at least a minimal wear condition of the brake lining over the threaded bore situated in the center, on the side facing the shaft; and in the position facing the threaded bore of the nut, the shaft has a recess for receiving the screw if this screw extends beyond the central threaded bore.

Preferably, the disc brake is constructed such that a bore is entered into the shaft in the direction of the first axis. The means of adjusting the wear, at least on one side, have a first pinion which is situated in this bore and is connected with the shaft in a partially rotatable manner, as well as a second pinion which engages with the first pinion and extends in the screw along the second axis. In which case, the second pinion is rotatably connected with this screw, and the screw can be displaced with respect to the second pinion along the second axis.

In order to permit a manual adjusting of the brake, particularly in the case of an exchange of the brake lining, the arrangement is such that the first pinion contains a spindle which extends beyond the bore of the shaft through the housing in such a manner that a torque can be applied from outside the housing.

Furthermore, the second pinion and the screw are rotatably connected by a kinematic chain with the shaft of the rotatable lever device. The kinematic chain contains a free wheel and a torque limiting device, and the free wheel has an outer cage and an inner cage which are connected with one another only in one rotating direction.

According to a first embodiment of a means for adjusting the wear, the outer cage of the free wheel is arranged in the bore of the shaft and is rotatably fastened thereto. The torque limiting device also is constructed in the bore of the shaft, and by way of this torque limiting device, the first pinion is rotatably connected with the inner cage of the free wheel.

A second embodiment of the means for adjusting the wear according to the invention provides that the outer cage of the free wheel is constructed in the bore of the shaft and is rotatably connected therewith. The inner cage of the free wheel is rotatably connected with a third pinion which is situated coaxially and outside the first pinion and meshes with a fourth pinion which is situated in the screw coaxially to the second pinion and outside thereof. The torque limiting device is arranged in the screw and is functionally connected between the fourth pinion and this screw.

A third embodiment of the means for adjusting the wear of the disc brake according to the invention provides that a third pinion is situated coaxially and outside the first pinion inside the bore of the shaft and is rotatably connected therewith. This third pinion meshes with a fourth pinion which is situated in the screw coaxially with respect to the second pinion and outside thereof. The free wheel and the torque limiting device are constructed inside the screw and rotatably connect the fourth pinion with the second pinion and with the screw.

The torque limiting device may correspond to a spherical construction which is known per se.

Preferably, the bearing of the shaft is constructed such that, on both sides of the bearing sections of the eccentric, it has two additional bearing sections whose axes extend along the first axis and by means of which the shaft of the rotatable lever devices is carried by the housing. This arrangement permits a further reduction of the constructional dimensions of the brake according to the invention in the direction of the first axis to such an extent that the shaft can be disposed in the housing outside the effective area between the eccentric and the nut.

In the following, the invention will be explained by means of several embodiments with reference to the attached drawing.

DETAILED DESCRIPTION OF THE PREFERRED EMBODIMENTS

Figure 1:
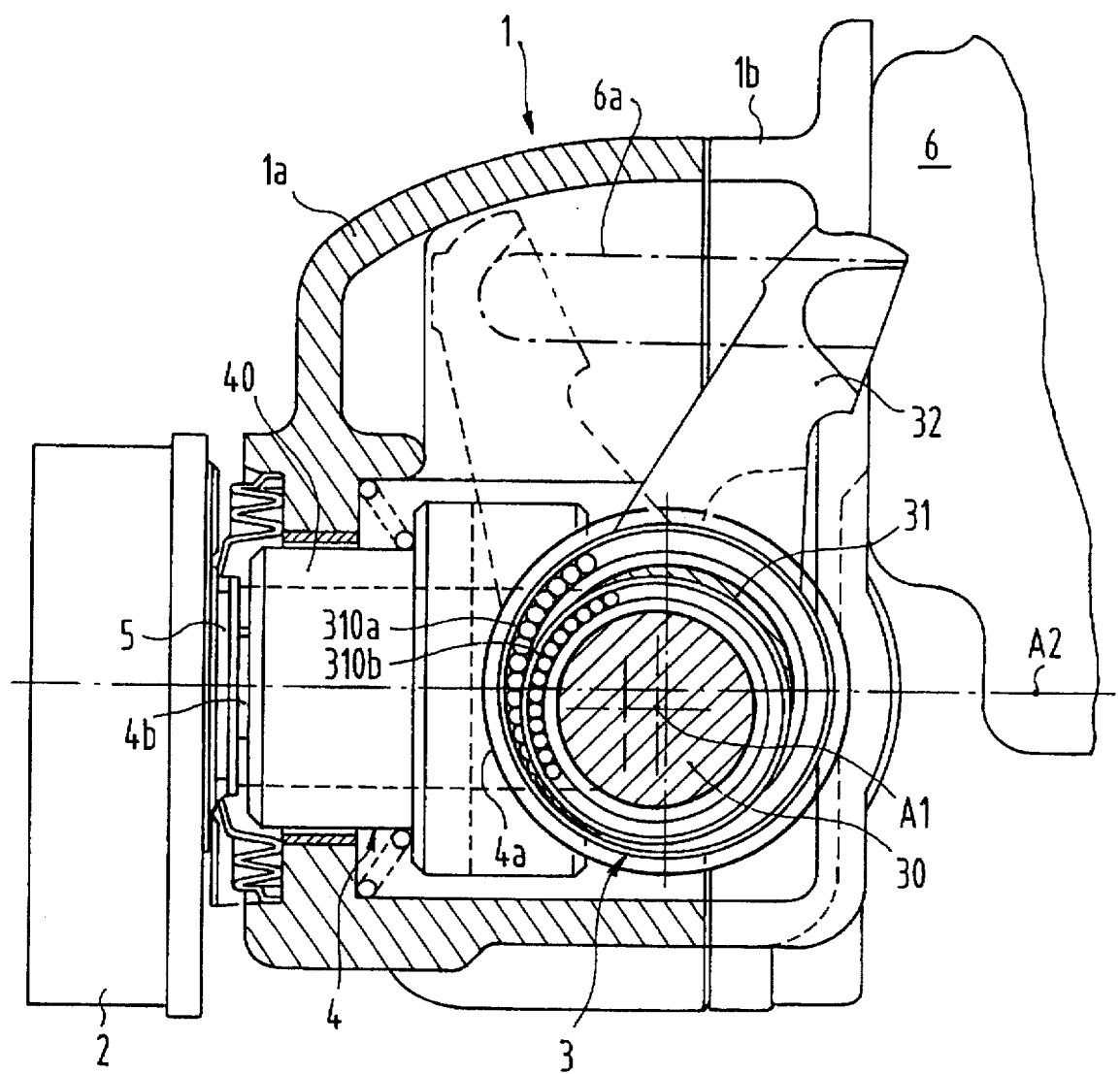
FIG. 1 is a sectional view of the brake according to the invention along a plane extending perpendicularly to the first axis and in parallel to the second axis.

As illustrated in FIG. 1, the disc brake according to the invention essentially has a housing 1 which is fastened on the vehicle equipped with the disc brake and consists of two parts 1a and 1b which are connected with one another. A brake lining 2, which can be actuated by the brake, can be displaced relative to the housing in order to engage a brake disc (not shown) which is rotatably connected with the wheels of the vehicle. A lever device 3 is provided which can be rotated about an axis A1 in the housing and has a shaft 30 provided with an eccentric 31 as well as an actuating or rotating lever 32. An eccentric follower in the form of a pressure member 4 is also provided which has a first end 4a and a second end 4b. The eccentric 31 rests on the first end 4a, while the pressure member with the second end 4a acts upon the friction or brake lining 2 by a brake shoe 5.

The actuating or rotating lever 32 is connected with the shaft 30 and extends essentially perpendicularly to the axis A1 in such a manner that the shaft 30 can be rotated about the axis A1 when a pressure is exercised on the rotating lever. Thus, for example, by means of a pressure rod 6a of a pneumatic application device 6 fixed on the housing 1, a pressure is in effect in the direction of the brake lining 2. In FIG. 1, the pressure rod 6a is outlined in broken lines in an extreme actuating position of the brake.

The eccentric follower in the form of the pressure member 4 can be displaced in the housing 1 along a second axis A2 which is aligned essentially perpendicularly with respect to the first axis A1. That is, the pressure member moves toward the left under the effect of the force exercised by the eccentric 31 according to FIG. 1 when the shaft 30 rotates, in such a manner that the brake lining 2 is pressed against the brake disc (which is not shown).

Figure 2:
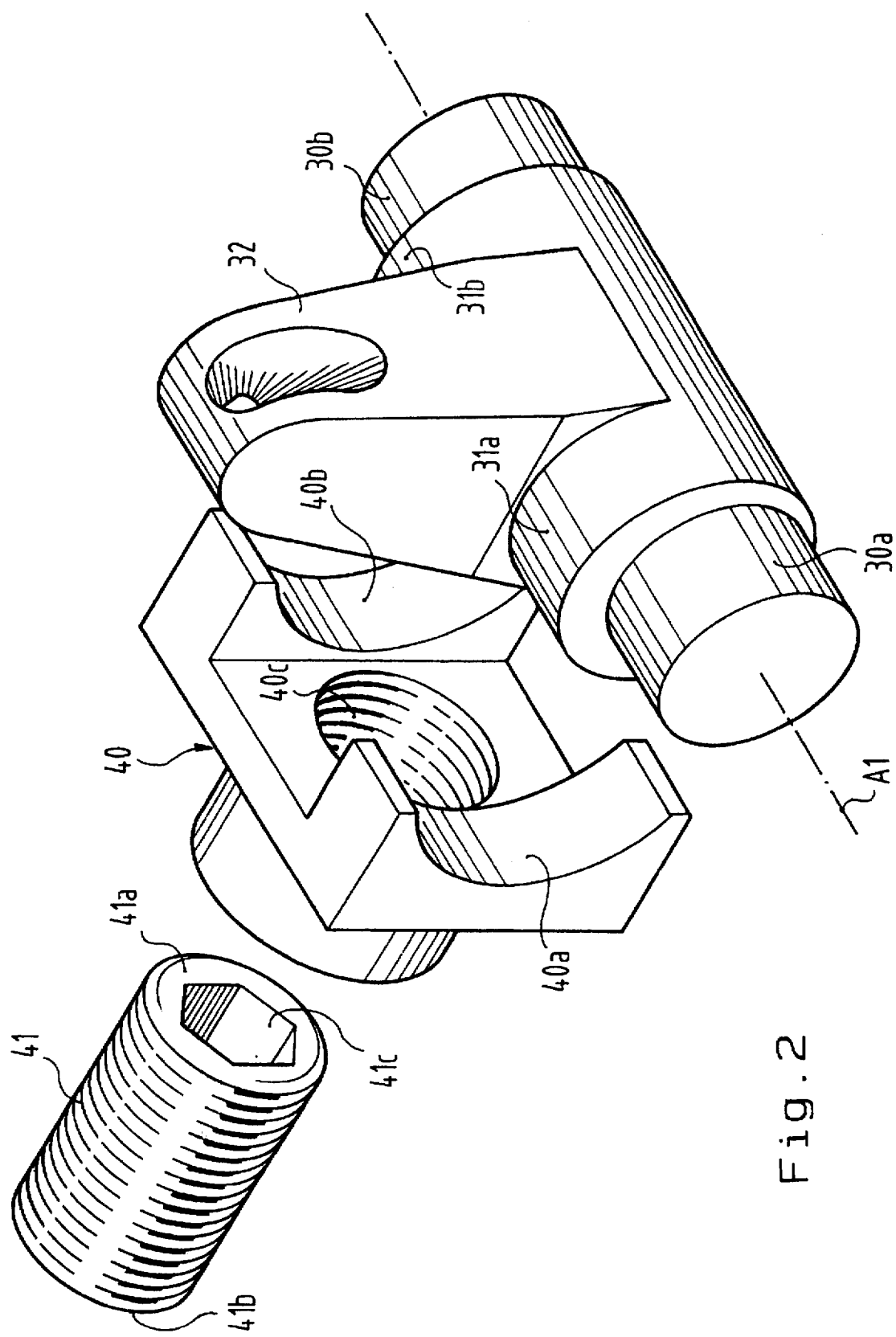
FIG. 2 is an extended perspective view of the essential components of the brake according to the invention.

According to FIG. 2, the eccentric 31 has two bearing sections 31a and 31b; that is, two cylinder bodies which are offset with respect to the axis A1 but whose axis extends in parallel to axis A1. The two cylinders are constructed on both sides of the rotating lever 32 on the shaft 30.

Furthermore, on the side of its first end 4a, the pressure member 4 has a nut 40 with a central threaded bore 40c and two lateral, essentially semicylindrical bearing shells 40a and 40b which are used for receiving the corresponding bearing sections 31a and 31b of the eccentric 31. The pressure member also comprises a screw 41 whose first end 41a engages in the threaded bore 40c of the nut 40, while the second end 41b forms the second end 4b of the pressure member 4.

A device for adjusting the wear is provided, which is described in the following with reference to the drawing and by which the screw 41 is screwed on or unscrewed with respect to the nut 40 as a function of the wear of the brake lining 2 in order to increasingly enlarge the distance between the first axis A1 and the second end 4b of the pressure member 4 by a lengthening of the pressure member 4.

Figure 3:
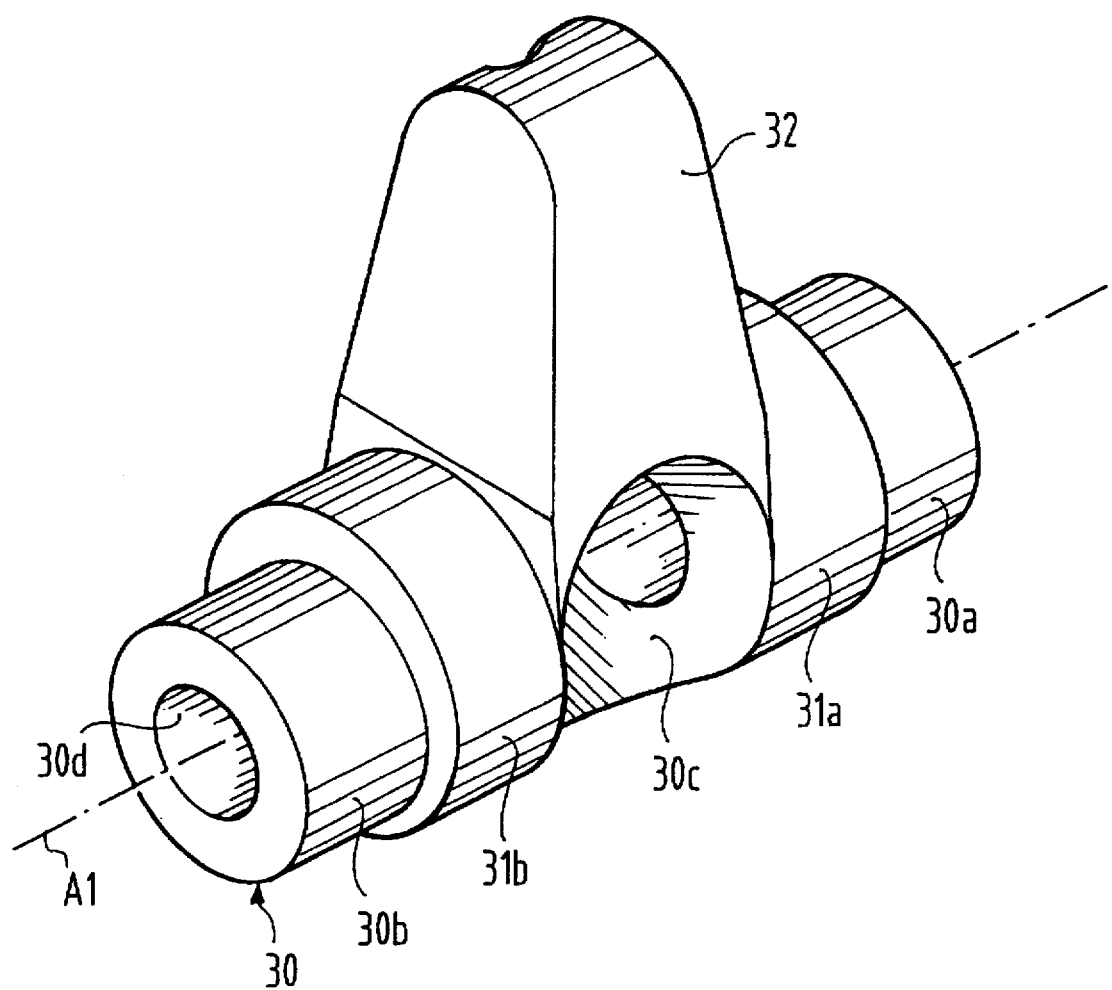
FIG. 3 is a perspective view of the rotatable lever device in a view which is opposite to the viewing direction according to FIG. 2.

According to an important characteristic of the invention, the lever device 3 is constructed in one piece, in which case a recess 30c, which is illustrated in FIG. 3, is machined out of the shaft 30. The recess 30c is aligned in the direction of the central threaded bore 40c of the nut 40 and receives the first end 41a of the screw 41 which extends beyond the threaded bore 40c when the friction lining 2 is new or only slightly worn. The length of the screw 41 is therefore larger than the length of the threaded bore 40c.

According to FIG. 3 and the figures which follow, the shaft 30 is penetrated on at least a portion of its length by a bore 30d which extends along the first axis A1 and permits the accommodating of at least some of the components for adjusting the wear.

The adjusting components contain at least a first pinion 71 which, in the bore 30d is partially rotatably connected with the shaft 30, as well as a second pinion 72 which engages with the first pinion and, while extending inside the screw 41 along the second axis A2, is rotatably connected with this screw.

Since the function of the screw 41 consists of moving along the axis A2 when being unscrewed with respect to the nut 40, while the second pinion 72 maintains an essentially constant position along this axis, devices are provided in order to rotatably connect the screw 41 and the second pinion 72 while, at the same time, the screw 41 can be displaced with respect to this pinion 72.

Thus, the second pinion 72 (FIGS. 4 and 5) may be provided with a shaft or a spindle 72a of a 6-cornered cross-section, in any case with a non-circular cross-section. In which case, the spindle 72a is introduced into a complementarily shaped recess 41c of the screw which forms the internal cross-section of a fastened component.

As a variant (FIGS. 6–9), the component 8 may be fastened, for example, on the spindle 72a of the second pinion 72 and may be situated inside the inner profile 41c of the screw without being able to turn.

The second pinion 72 and the screw 41 can be rotatably connected with the shaft 30 of the lever device 3 by a kinematic chain. This kinematic chain comprises a free wheel 9 and a torque limiting device 10. The free wheel 9 consists of an outer cage 9a and an inner cage 9b which are connected with one another in a rotating direction. The torque limiting device 10 corresponds to the spherical construction known per se using two discs 10a and 10b which are pressed against one another by a spring 10c and contain recesses which extend in the opposite direction while facing one another, in which recesses the spheres 10d are situated.

As illustrated in each of FIGS. 4 to 9, the second pinion 72 and its spindle 72a are secured along the second axis A2 with respect to the longitudinal displacement. The end of the spindle 72a is elastically held in a cylindrical component 11.

The component 11 is situated in the bore 30d and can be inserted into this position through the recess 30c.

The first pinion 71 is provided with a shaft or a spindle which can be deflected in the transverse direction in the manner of a cardan joint and preferably has several rotatably connected parts 71a, 71b, 71c. The parts extend beyond the bore 30d, which penetrates the housing, in such a manner that a rotation of the first pinion 71 about the axis A1 can be implemented from outside the housing when a torque is exercised on the head 71c.

Figure 4:
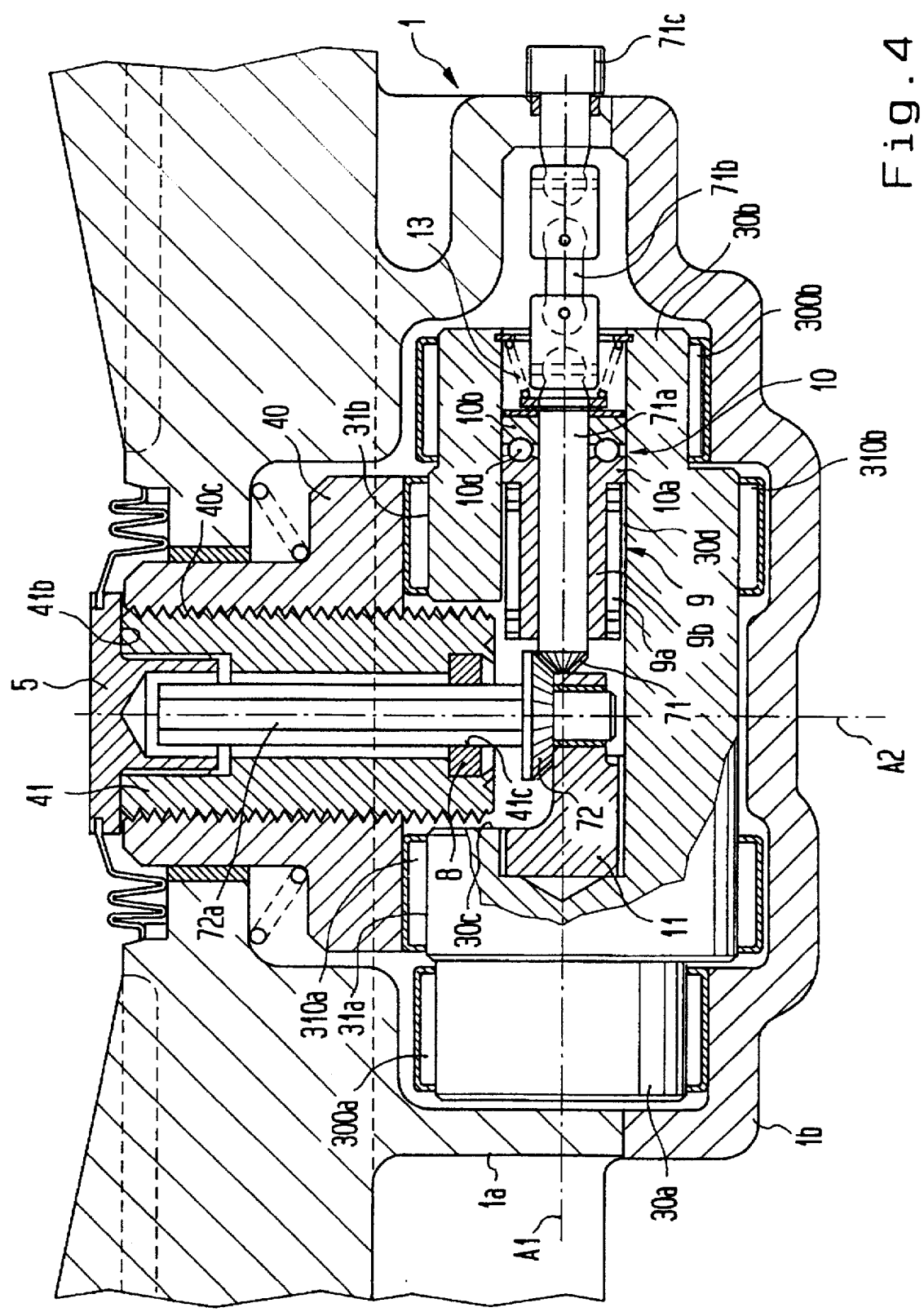
FIG. 4 is a sectional view of the brake according to the invention along a plane which extends parallel to the first and second axes, illustrating a first embodiment of the means for adjusting the wear.
Figure 5:
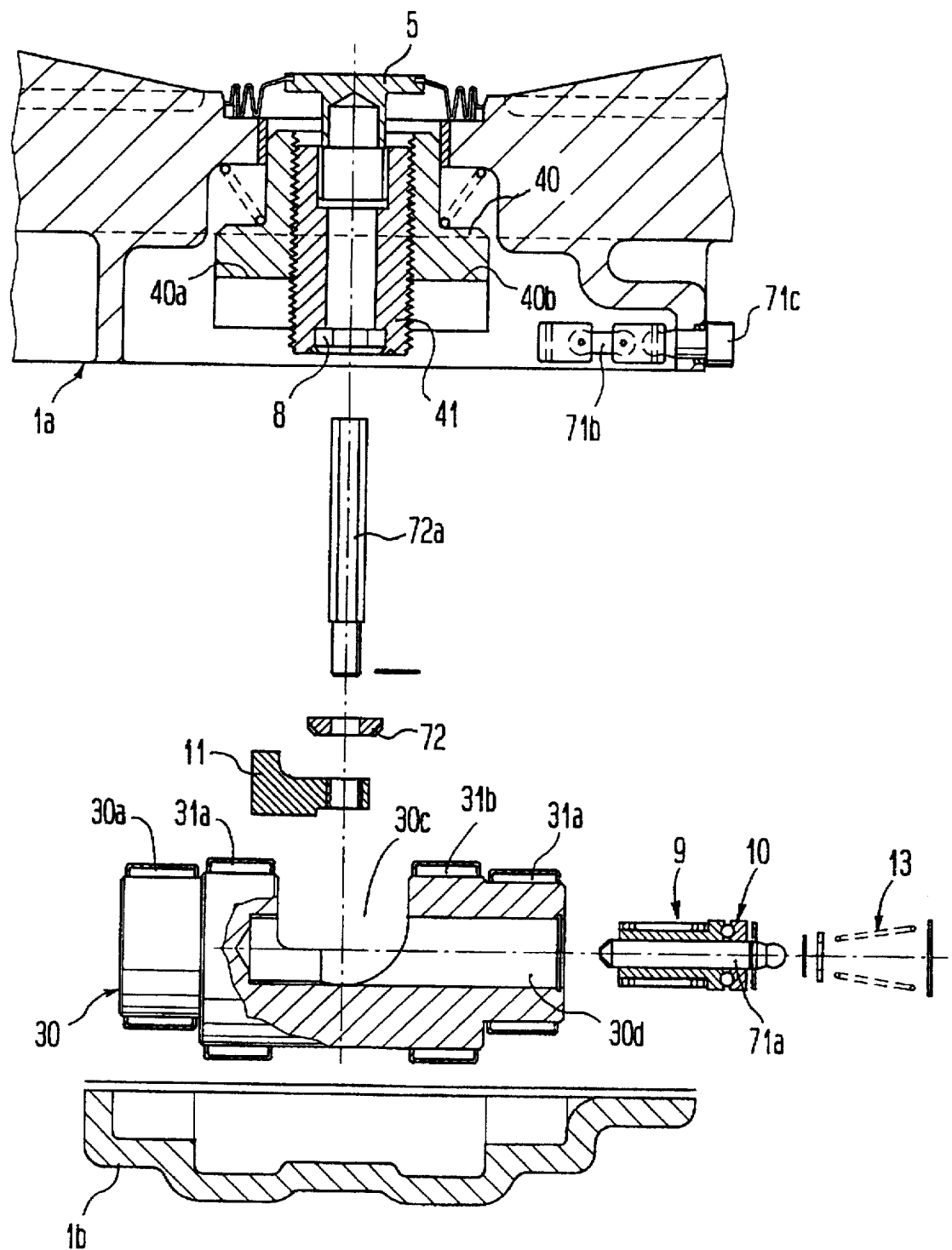
FIG. 5 is an exploded top view of the brake according to the invention of the representation of FIG. 4.

According to the first embodiment of the means for adjusting the wear, which is illustrated in FIGS. 4 and 5, the free wheel 9 is situated in the bore 30d of the shaft 30 in such a manner that its outer cage 9a is rotatably secured with respect to this bore. The torque limiting device 10 is also arranged in this bore and rotatably connects the inner cage 9b of the free wheel with the first pinion 71.

According to FIG. 4, such an arrangement makes it possible to reduce the number of pinions to two, in which case the spring 13 of the torque limiting device 10 can be used for pressing the first pinion 71 in the direction of the second pinion 72 since, on the one hand, the spring rests against the disc 10b of the torque limiting device and, on the other hand, the disc 10b is fastened to the first pinion 71 by the spindle part 71a of the first pinion 71.

As far as the wear adjustment is concerned, the method of operation of the brake illustrated in FIG. 4 is as follows:

When the pressure rod 6a is displaced by the pneumatic application device 6 (according to FIG. 1, toward the left), the shaft 30 is rotated about the first axis A1, in which case the outer cage 9a and, with it, the inner cage 9b and the disc 10a of the torque limiting device 10 are rotated.

If, because of the wear of the brake lining 6, the screw 41 can move along a certain distance (play) in the direction of the brake lining without encountering the significant resistance which occurs when the brake lining is pressed onto the disc, the second disc 10b, the spindle 71a and the pinion 71 are rotated about the first axis A1 by the first disc 10a of the torque limiting device 10, which causes the second pinion 72 and the spindle 72a to rotate about the second axis A2. As a result of the shaping of the spindle and of the fastened component 8, the screw 41 is rotated in the rotating direction about the axis A2, specifically in a direction which causes the extending or moving-out of the pressure member 4, such that the play resulting from the wear of the brake lining 2 is absorbed.

When this play is absorbed, the screw 41 takes up a reaction from the brake shoe 5, which reaction cannot be overcome in that a torque is exercised on the pinion 71, which torque is larger than the torque which the torque limiting device 10 can transmit. As a result of the subsequent rotation of the shaft 30 about the first axis A1 in the direction of the actuating of the brake, only the rotation of the free wheel 9 and of the disc 10a is therefore triggered whereas the disc 10b remains fixed in the rotating direction and moves in the direction facing away from the disc 10a because the spheres 10d move out of the recesses which act as a housing for them. The first pinion 71 will then disengage from the second pinion 72.

When the brake returns into its starting position in that the shaft 30 is rotated in the opposite direction, only the outer cage 9a of the free wheel 9 will follow this rotating movement of the shaft, in which case this movement is not transmitted to the inner cage 9b of this free wheel.

When the brake lining is worn off and must be replaced, because of the absorption of the wear, the screw 41 will be in a relatively screwed-on position with respect to the nut 40, that is, in a position which is relatively close to the brake shoe 4, in which case the first end 41a of this screw has left the recess 30 c of the shaft 30.

Under these conditions, it is obviously necessary during the exchange of the brake lining 2 to screw the screw 41 back in the direction of the interior of the nut 40.

This takes place in a simple manner in that, from outside the housing 1, a torque is exercised on the head 71c of the shaft 71a, 71b; the torque causes the screw 41 to rotate by means of the engagement of the pinions 71 and 72.

Figure 6:
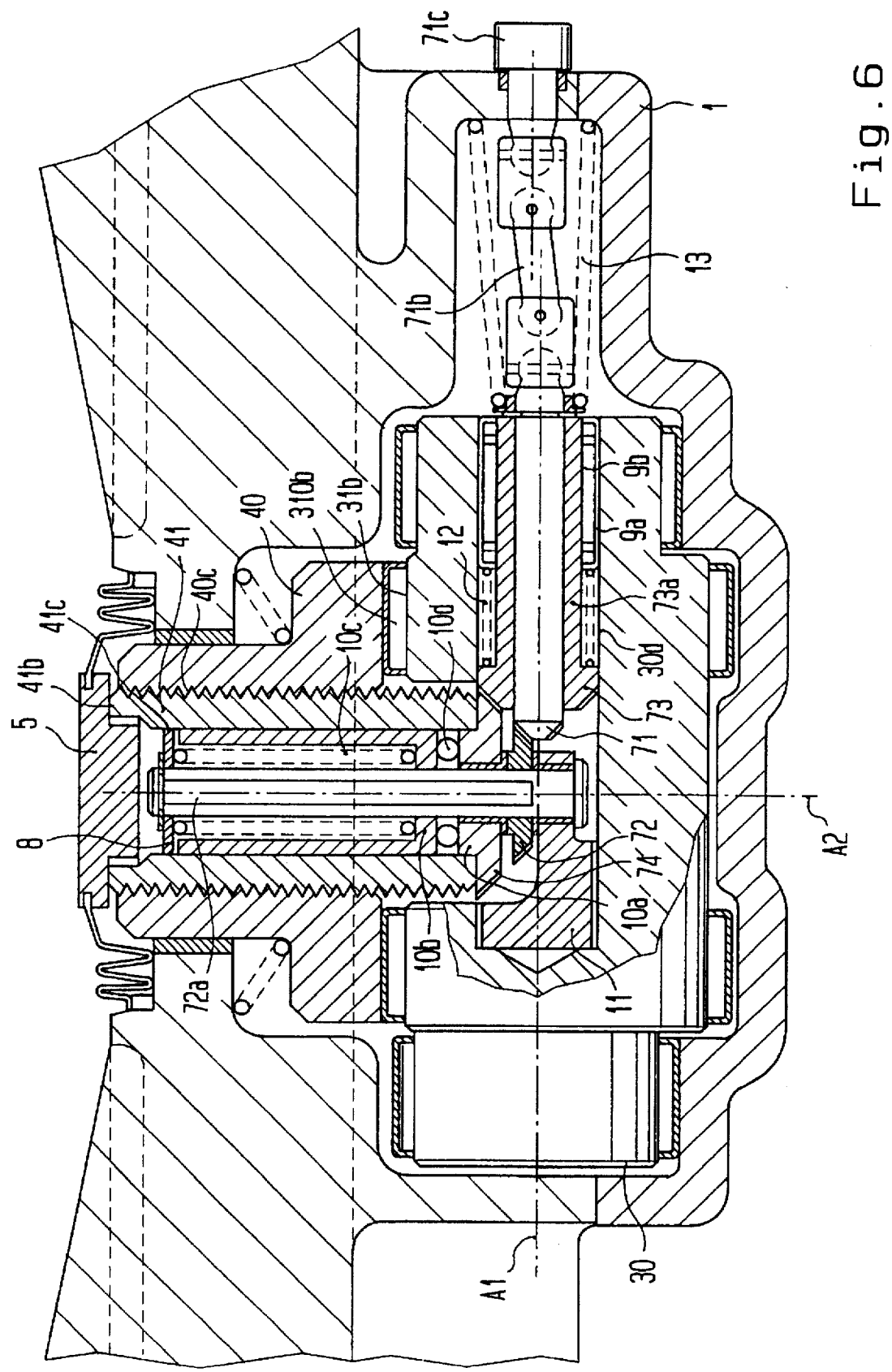
FIG. 6 is a sectional view of the brake according to the invention a plane extending in parallel to the first and second axis, illustrating a second embodiment of the means for adjusting the wear.
Figure 7:
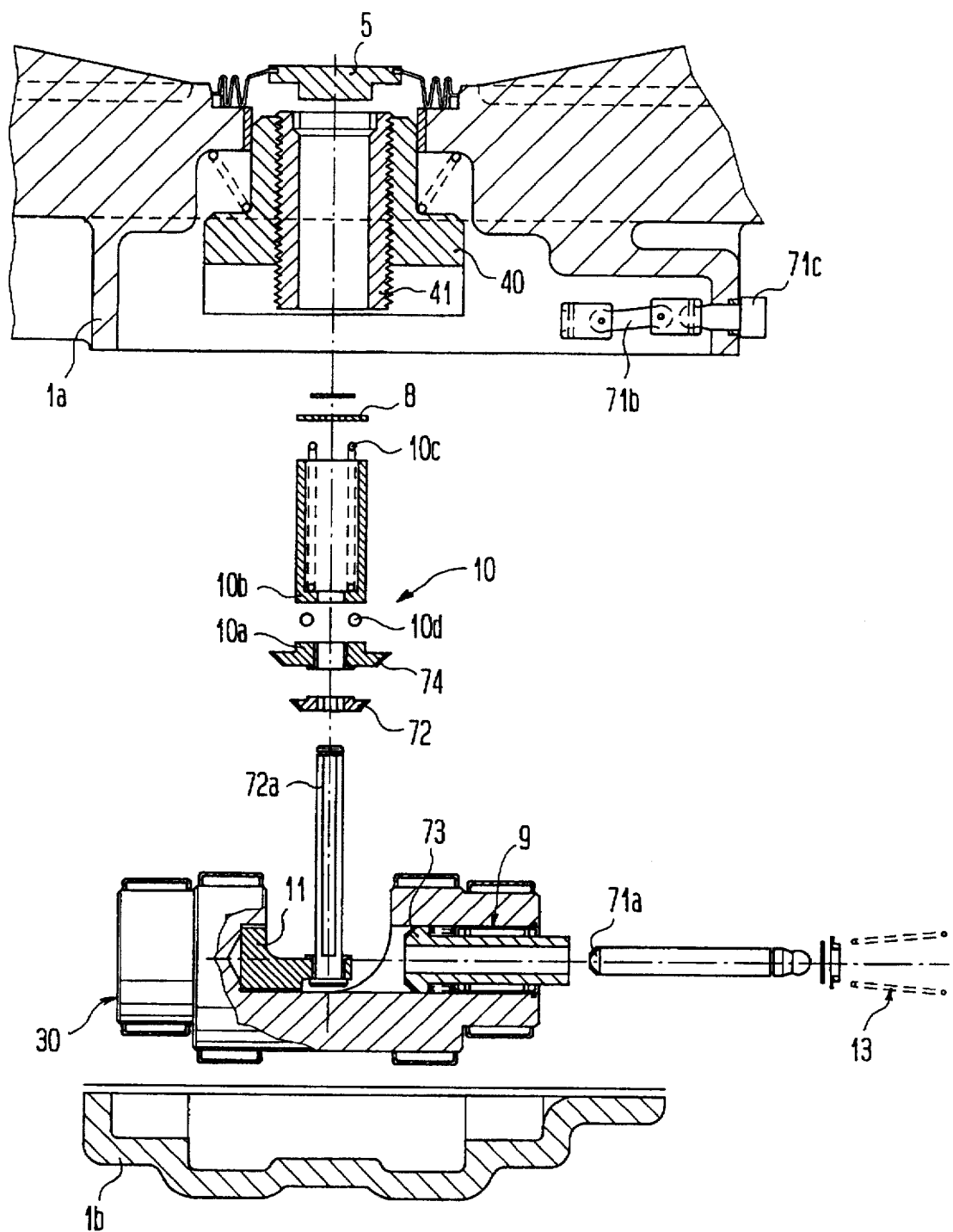
FIG. 7 is an exploded top view of the brake of the invention according to FIG. 6.

According to the second embodiment of the parts used for adjusting the wear, as indicated in FIGS. 6 and 7, the free wheel 9 will still be in the bore 30d of the shaft 30 so that its outer cage 9a is in the bore 30d being secured with respect to rotation while, on the other hand, the torque limiting device 10 is constructed in the screw 41.

In particular, the inner cage 9b of the free wheel 9 is rotatably connected by a spindle or a journal 73a with a third pinion 73 which is situated coaxially with respect to the first pinion 71 and outside the pinion 72 and, in the axial direction, is subjected to a bracing of a spring 12 in order to engage in a fourth pinion 74. The pinion 74 is situated in the screw 41 coaxially with respect to the second pinion 72 and on its exterior side.

In the case of a brake according to such an embodiment of the invention, the torque limiting device 10 is functionally arranged between the fourth pinion 74 and the screw 41, the method of operation being as follows:

If a play exists which has to be adjusted, the rotation of the shaft 30 is transmitted to the outer cage 9a of the free wheel 9, also to its inner cage 9b, to the third pinion 73, the fourth pinion 74, to the first disc 10a of the torque limiting device 10, to the second disc 10b, and finally to the screw 41 which is rotatably connected with the second disc 10b but can be freely displaced along the axis A2.

As soon as the play has been absorbed or adjusted, the torque limiting device 10 will detach, as in the case of the above-explained embodiment, and will cease to transmit the rotating movement of the shaft 30 to the screw.

In the same manner, the free wheel 9 will detach when the shaft rotates in the direction of the starting position of the brake. After the exchange of the friction lining, the screw can easily be returned into its starting position in that a torque is exercised on the head 71c of the spindle 71a, 71b.

Figure 8:
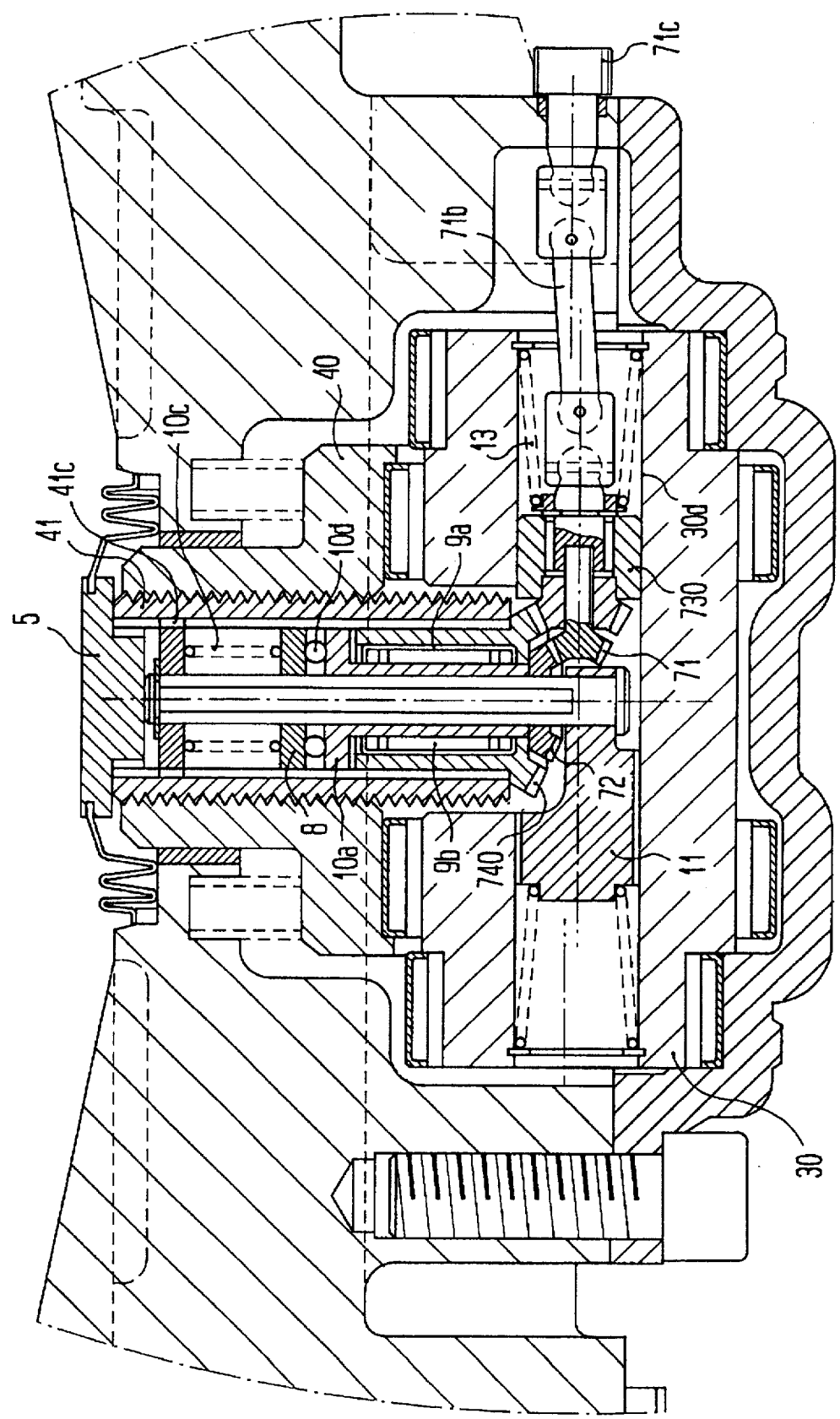
FIG. 8 is a sectional view of the brake according to the invention a plane extending in parallel to the first and second axis, while illustrating a third embodiment of the means for adjusting the wear.
Figure 9:
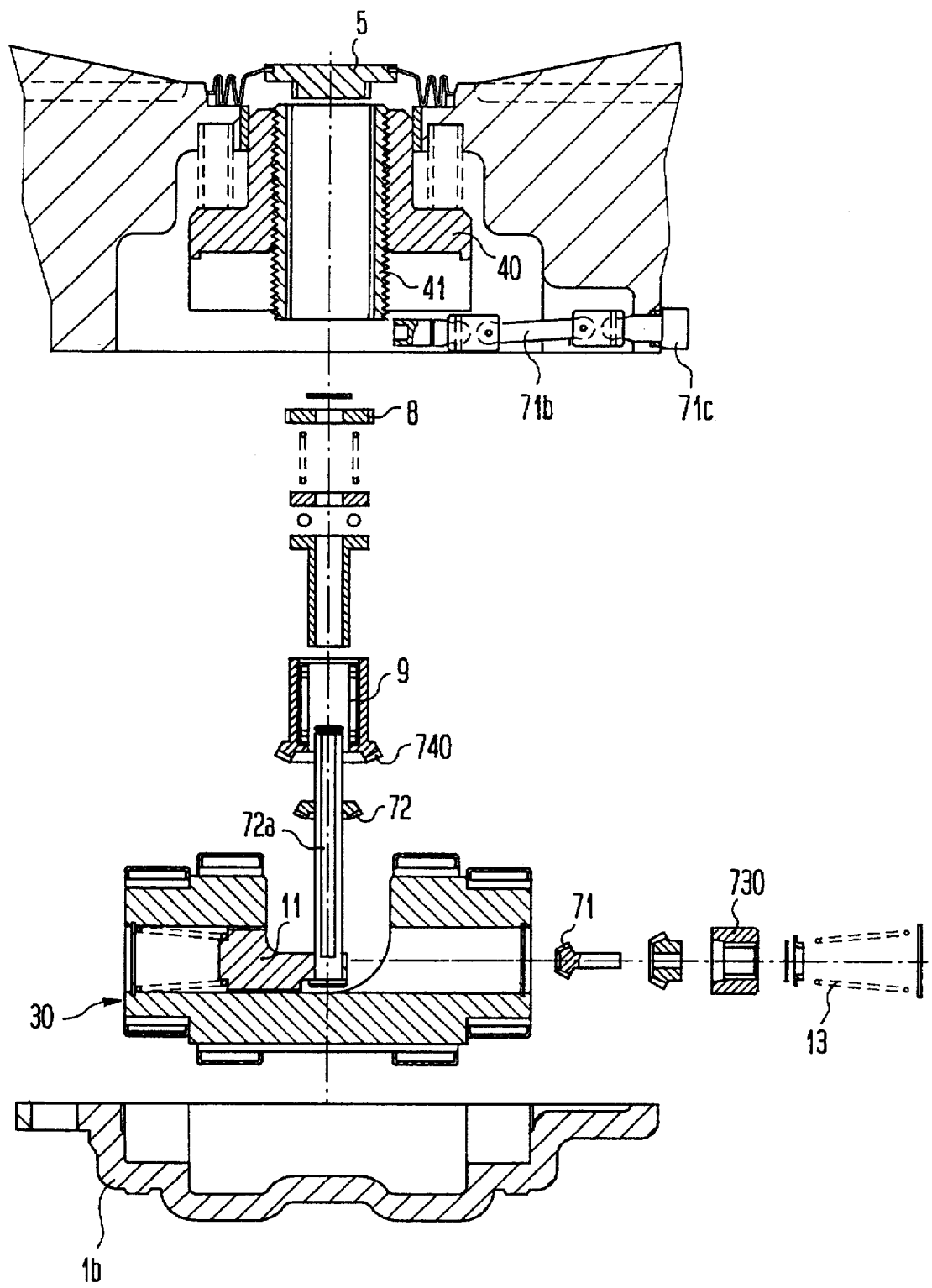
FIG. 9 is an elongated top view of the brake of the invention according to FIG. 8.

In the case of the third embodiment of the components for adjusting the wear illustrated in FIGS. 8 and 9, the free wheel 9 and the torque limiting device 10 are both situated inside the screw 41.

In particular, a third pinion 730 is provided which is arranged coaxially and outside the first pinion 71 in the bore 30d of the shaft 30 and is secured with respect to it in the rotating direction. This pinion 730 meshes with a fourth pinion 740 which is situated in the screw 41 coaxially with respect to the second pinion 72 and outside thereof. In a rotatable manner, the free wheel 9 and the torque limiting device 10 connect the first pinion 71 with the second pinion 71 and with the screw 41.

If play is to be adjusted, the rotation of the shaft 30 is transmitted to the third pinion 730, to the fourth pinion 740, to the outer cage 9a of the free wheel 9, which is situated in the fourth pinion and is rotatably fastened to it, to the inner cage 9b of the free wheel 9 and to the torque limiting device 10, whose first disc 10a is rotatably fastened to the inner cage 9b of the free wheel 9 and whose second disc 10 is formed by the component 8, in which case both are rotatably connected with the screw 41 and with the second pinion 72.

As soon as the play was absorbed or adjusted, the torque limiting device 10 will detach, as in the case of the above-explained embodiment, and will cease to transmit the rotating movement of the shaft 30 to the screw 41.

In the same manner, the free wheel 9 will detach when the shaft 30 rotates in the direction of the starting position of the brake. After the exchange of the brake lining, the screw can easily be returned into its starting position in that a torque is exercised on the head 71c of the spindle 71a, 71b.

According to FIG. 8, a spring 13 can be used in all embodiments in order to press the spindle or the shaft portion 71b, which extends through the housing, in the direction of the shaft portion fastened to the first pinion 71. In this case, it is possible to press the first pinion 71 in the direction of the second pinion 72 in order to cause these to engage with one another.

According to an advantageous characteristic of the invention, which can be applied to the explained embodiments, the shaft 30 has, on both sides of the bearing sections 31a and 31b of the eccentric, two additional bearings 30a and 30b whose axes coincide with the first axis A1 and by means of which the shaft 30 is held in the housing.

According to FIGS. 1 and 4 to 9, each of the bearing sections 30a, 30b of the eccentric and each of the bearing sections 31a and 31b is supported by means of corresponding needle bearings 300a, 300b, 310a and 310b with respect to the construction of the housing.

We claim:

1. A disc brake, particularly for vehicles, having a stationary housing,
   at least one friction or brake lining which, when the brake is actuated, is displaced with respect to the housing,
   a lever device with a shaft including an eccentric rotatable about a first axis and with an actuating lever fastened to the shaft and extending essentially perpendicularly to the first axis such that, as a result of the rotation of the shaft about the first axis, the brake can be actuated,
   an eccentric follower displaceable within the housing along a second axis which extends essentially perpendicularly to the first axis, the follower resting with a first end on the eccentric and with a second end acting with respect to the brake lining; and
   adjusting means for increasing the distance separating the first axis from the second end of the follower as a function of the wear of the brake lining, wherein;
   the eccentric has two bearing sections arranged on either side of the rotating lever;
   the eccentric follower has, on its first end, a nut with a central threaded bore as well as two essentially semicylindrical lateral bearing shells receiving the corresponding bearing sections of the eccentric;
   the eccentric follower has a screw whose first end engages the nut, while a second end of the screw forms the second end of the eccentric follower; and
   the adjusting means generates a relative rotation of the screw and of the nut whereby the second end of the eccentric follower can be extended.

2. Disc brake according to claim 1, wherein
   the lever device with the eccentric, shaft and actuating lever is manufactured of one piece,
   the screw extends by an amount which corresponds at least to a minimal wear condition of the brake lining beyond the central threaded bore, and
   in a surface facing the threaded bore of the nut, the shaft has a recess for receiving the screw if this screw extends beyond the central threaded bore.

3. Disc brake according to claim 2, including
   a bore in the shaft in the direction of the first axis,
   the adjusting means, at least on one side, has a first pinion which is situated in the bore of the shaft and is connected with the shaft in a partially rotatable manner,
   including, a second pinion, which engages with the first pinion and extends in the screw along the second axis, the second pinion being rotatably connected with this screw, and the screw being displaceable along the second axis with respect to the second pinion.

4. Disc brake according to claim 3, wherein the first pinion contains a spindle which extends beyond the bore of the shaft through the housing in such a manner that a torque can be applied to the shaft from outside the housing via the spindle.

5. Disc brake according to claim 3 wherein
   the second pinion and the screw, by way of a kinematic chain, are rotatably connected with the shaft of the rotatable lever device,
   the kinematic chain containing a free wheel and a torque limiting device, and
   the free wheel has an outer cage and an inner cage which are connected with one another only in one rotating direction.

6. Disc brake according to claim 5, wherein
   the outer cage of the free wheel is arranged in the bore of the shaft and is rotatably fastened therein,
   the torque limiting device is also in the bore of the shaft, and
   the first pinion, by way of this torque limiting device, is rotatably connected with the inner cage of the free wheel.

7. Disc brake according to claim 5, wherein
   the outer cage of the free wheel is in the bore of the shaft and is rotatably connected therewith, the inner cage of the free wheel is rotatably connected with a third pinion which is coaxial and outside the first pinion and meshes with a fourth pinion which is in the screw coaxial with respect to the second pinion and outside thereof, and
   the torque limiting device is in the screw and is functionally connected between the fourth pinion and the screw.

8. Disc brake according to claim 5, wherein
   a third pinion is coaxial and outside the first pinion inside the bore of the shaft and is rotatably connected therewith,
   the third pinion meshes with a fourth pinion which is in the screw coaxial with respect to the second pinion and outside thereof, and
   the free wheel and the torque limiting device are constructed inside the screw and rotatably connect the fourth pinion with the second pinion and with the screw.

9. Disc brake according to claim 5 wherein the torque limiting device corresponds to a spherical construction.

10. Disc brake according to, claim 1 wherein on both sides of the bearing sections, the shaft has two additional bearing sections whose axes extend along the first axis and by means of which the shaft of the rotatable lever device is carried by the housing.

* * * * *